(12) United States Patent  (10) Patent No.: US 11,009,624 B2
Alanís Valle et al.  (45) Date of Patent: May 18, 2021

(54) CONTROLLING COOKING APPARATUS BASED ON WEATHER AND LOCATION INFORMATION

(71) Applicant: International Business Machines Corporation, Armonk, NY (US)

(72) Inventors: Enrique Alanís Valle, Tlaquepaque (MX); William J. Green, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 430 days.

(21) Appl. No.: 15/982,272

(22) Filed: May 17, 2018

(65) Prior Publication Data

US 2019/0353826 A1    Nov. 21, 2019

(51) Int. Cl.
*F24C 7/00* (2006.01)
*G01W 1/02* (2006.01)
(Continued)

(52) U.S. Cl.
CPC .......... *G01W 1/02* (2013.01); *A23L 5/00* (2016.08); *G06F 16/90324* (2019.01); *G01W 2203/00* (2013.01)

(58) Field of Classification Search
CPC ....... G01W 1/02; G01W 2203/00; A23L 5/00; G06F 16/90324
See application file for complete search history.

(56) References Cited

U.S. PATENT DOCUMENTS 9,060,212 B2    6/2015  Loic
9,439,530 B2    9/2016  Logan et al.
(Continued)

FOREIGN PATENT DOCUMENTS

CN    1278077 C     10/2006
CN    107660992 A    2/2018
EP    1028604 A2    8/2000

OTHER PUBLICATIONS

Chia-Chen Lee, "Chef Tutor 101—A Temperature Navigation Cooking App with "Clipo" Thermometer." Rochester Institute of Technology, Feb. 24, 2016, 24 pgs.

*Primary Examiner* — Mohamed Charioui
*Assistant Examiner* — Christine Y Liao
(74) *Attorney, Agent, or Firm* — Cantor Colburn LLP; Tihon Poltavets (57) ABSTRACT

Examples of techniques for controlling a cooking apparatus based on weather and location information are disclosed. In one example implementation, a computer-implemented method includes receiving, by a processing device, a recipe for cooking a food item using a cooking apparatus, the recipe comprising a suggested cooking time and a suggested cooking temperature. The method further includes determining, by the processing device, a location associated with the cooking apparatus. The method further includes determining, by the processing device, weather conditions associated with the location. The method further includes analyzing, by the processing device, the recipe, based at least in part on the location and the weather conditions, to determine whether to adjust one or more of the suggested cooking time and the suggested cooking temperature. The method further includes controlling, by the processing device, the cooking apparatus, based at least in part on the analysis, to cook the food item.

20 Claims, 6 Drawing Sheets

(51) Int. Cl.
*A23L 5/00* (2016.01)
*G06F 16/9032* (2019.01)

(56) References Cited

U.S. PATENT DOCUMENTS

| | | |
|---|---|---|
| 9,626,078 B2 | 4/2017 | Jung et al. |
| 9,661,118 B1 | 5/2017 | Mucha |
| 2002/0010637 A1* | 1/2002 | Lieu .................. G06Q 30/06 705/26.1 |
| 2011/0055044 A1 | 3/2011 | Wiedl |
| 2013/0092032 A1* | 4/2013 | Cafferty .................. F24C 7/08 99/325 |
| 2014/0295822 A1 | 10/2014 | Koo et al. |
| 2015/0208858 A1* | 7/2015 | Robbins .................. A47J 36/00 426/231 |
| 2016/0314255 A1 | 10/2016 | Cook et al. |
| 2016/0323457 A1 | 11/2016 | Isomäki et al. |
| 2017/0011649 A1 | 1/2017 | Lee et al. |

* cited by examiner

| Inputs / Conditions | 1 Cup Butter | 2.25 Cut Flour | 1 tsp Salt | 1 Egg | .75 Cup Br Sugar | .75 Cup Sugar | 1 tsp Vanilla | 12 oz Choc Chips | Bake Time 9 min | Oven Temp 375F |
|---|---|---|---|---|---|---|---|---|---|---|
| Location | | | | | | | | | | |
| Altitude 3000 ft. | +6.3% +1 tbsp | +0.75% +0.75 tbsp | NC | NC (Possible add egg if liquid eggs) | -6.3% -1 tbsp | -6.3% -1 tbsp | NC | NC | -16% -87 sec | +15F 390F |
| Mountains (inland) | NC | NC | NC | NC | NC | NC | NC | NC | NC | NC |
| Weather | | | | | | | | | | |
| 60 F (Optimal) | | NC | NC | NC | NC | NC | NC | NC | NC | NC |
| 46% RH (under 50% = DRY) | +0.25 tbsp | NC | NC | NC | NC | NC | NC | NC | +5% | 387F |
| Clear Skies | NC | NC | NC | NC | NC | NC | NC | NC | NC | NC |
| Equipment | | | | | | | | | | |
| GE Oven Model 760 Runs Hotter | NC | NC | NC | NC | .75 Cup Br Sugar (remove 1 tbsp from level cup) | .75 Cup Sugar (remove 1 tbsp from level cup) | NC | NC | 10% | -8% |
| ADJUSTED RECIPE | 1 cup, 1.25 tbsp Butter | 2.33 cups Flour | 1 tsp salt | 1 egg | | | NC | NC | 11 minutes | 356F |

FIG. 6

CONTROLLING COOKING APPARATUS BASED ON WEATHER AND LOCATION INFORMATION

BACKGROUND

The present invention generally relates to processing systems, and more specifically, to controlling a cooking apparatus based on weather and location information.

A cooking apparatus, such as an oven, microwave, burner, range, grill, etc., can be used to prepare food items (e.g., a foodstuff) by heating the food items. Many cooking apparatus can be set at specific temperatures. Additionally, timers can be used to control how long food items cook. Some food items, and particularly bakery items (e.g., cookies, cakes, pies, bread, etc.), are sensitive to variations in the heat (temperature) supplied by a cooking apparatus and/or the duration for which the food item is subjected to the heat applied. Variations in time and temperature can result from inconsistencies in the cooking apparatus (e.g., a hot or cold spot), elevation, weather, and the like.

SUMMARY

Embodiments of the present invention are directed to a computer-implemented method for controlling a cooking apparatus based on weather and location information. A non-limiting example of the computer-implemented method includes receiving, by a processing device, a recipe for cooking a food item using a cooking apparatus, the recipe comprising a suggested cooking time and a suggested cooking temperature. The method further includes determining, by the processing device, a location associated with the cooking apparatus. The method further includes determining, by the processing device, weather conditions associated with the location. The method further includes analyzing, by the processing device, the recipe, based at least in part on the location and the weather conditions, to determine whether to adjust one or more of the suggested cooking time and the suggested cooking temperature. The method further includes controlling, by the processing device, the cooking apparatus, based at least in part on the analysis, to cook the food item.

Embodiments of the present invention are directed to a system. A non-limiting example of the system includes a memory comprising computer readable instructions and a processing device for executing the computer readable instructions for performing a method controlling a cooking apparatus based on weather and location information.

Embodiments of the invention are directed to a computer program product. A non-limiting example of the computer program product includes a computer readable storage medium having program instructions embodied therewith. The program instructions are executable by a processing device to cause the processing device to perform a method for controlling a cooking apparatus based on weather and location information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
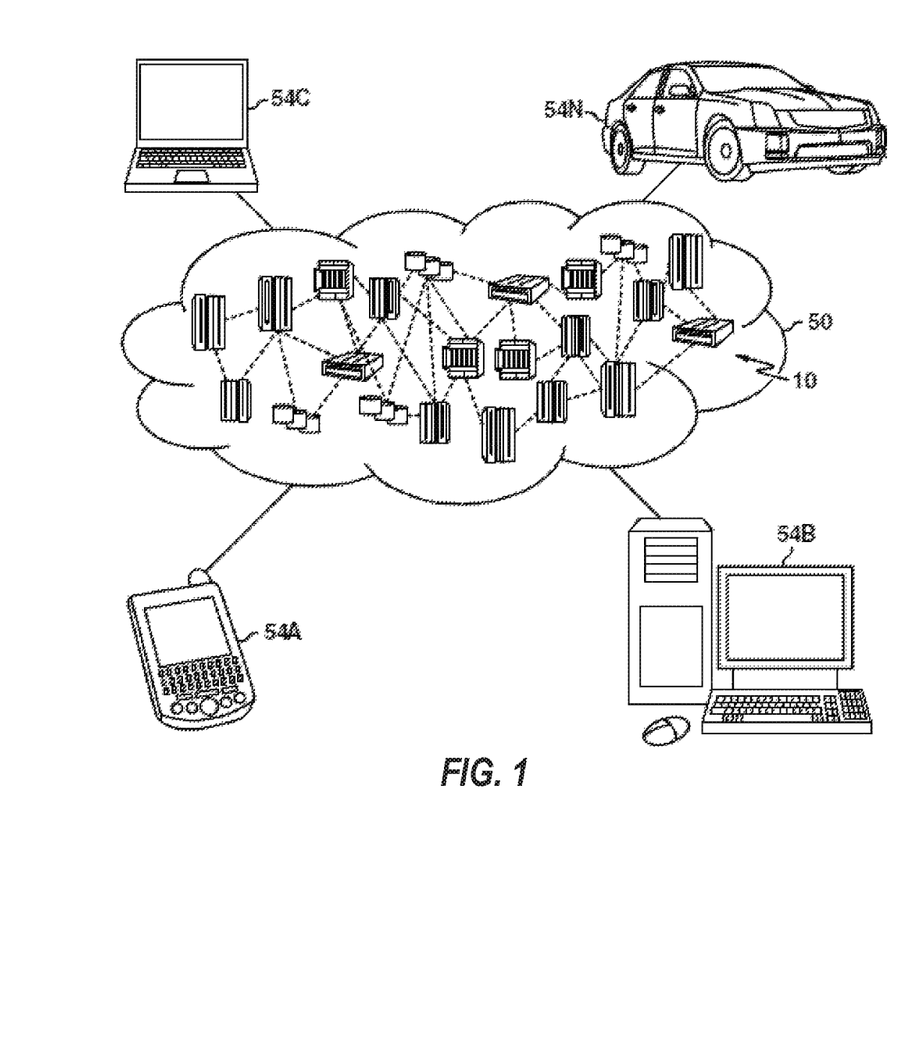
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
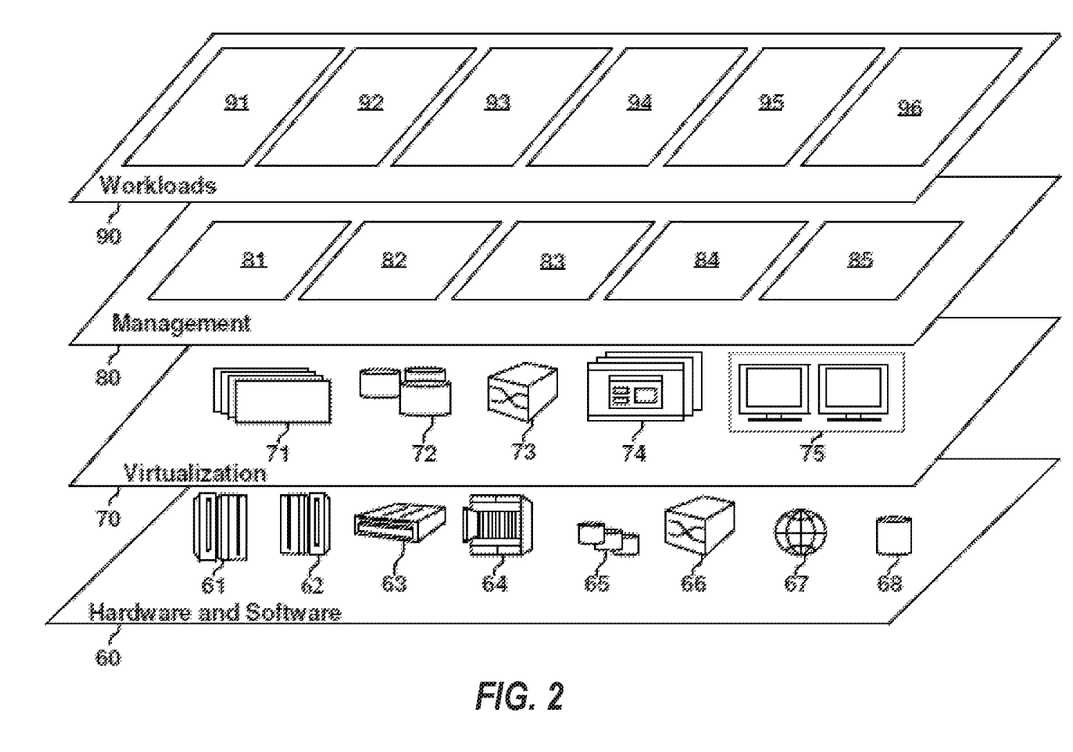
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling a cooking apparatus 96.

Figure 3:
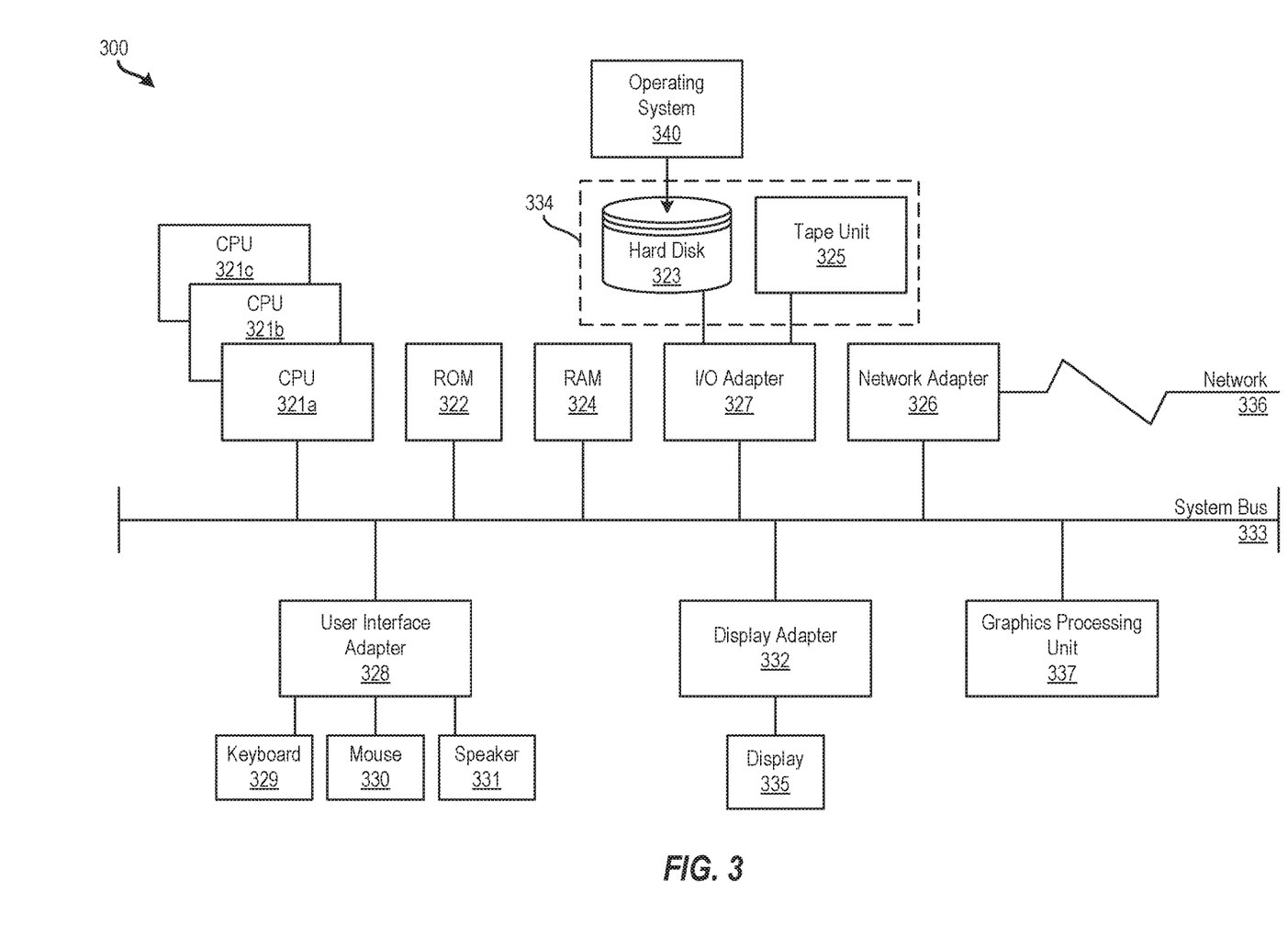
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage unit 325 or any other similar component. I/O adapter 327, hard disk 323, and tape storage unit 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 30, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Turning now to an overview of technologies that are more specifically relevant to embodiments of the invention, techniques are provided for controlling a cooking apparatus based on weather and location information. Food items may be prepared according to a recipe. Baked goods in particular often rely on precise quantities/portions of ingredients as well as specific time and temperature requirements. Variations in the ingredients or cooking conditions (e.g., time, temperature) can cause the quality of the food items to vary. These variations can be caused by weather conditions (i.e., barometric pressure can affect sensitive pastries, such as soufflés), cooking apparatus specifications (e.g., model, type, dimensions, etc.), altitude at which the cooking apparatus is located, input energy type (e.g., gas, electric, convection, induction, etc.).

To address these variations, a user often has to adjust ingredients and/or cooking conditions to differ from a recipe. This is typically done based on the user's own experience and prior outcomes. However, many times the user has to suffer poor outcomes of recipes in order to learn from those failures to make the proper adjustment. This can take time, and the user (and others) have to endure poor meals and/or waste food items because of it. This can be particularly discouraging to new and younger users due to these poor outcomes.

Turning now to an overview of the aspects of the invention, one or more embodiments of the invention address the above-described shortcomings of the prior art by controlling a cooking apparatus based on weather and location information. In particular, the present techniques consider weather and location to properly prepare a recipe by varying amounts of ingredients in the recipe, varying the cooking temperature, varying the cooking time, etc. For example, the present techniques can monitor weather conditions and adjust cooking time and/or temperate to account for changes in barometric pressure and/or humidity. The present techniques can also adjust cooking time and/or cooking temperature (or vary ingredients in the recipe) to account for changes in location (e.g., altitude).

Location, such as altitude, can affect cooking food items. Atmospheric pressure is generally lower at higher altitudes, and higher altitudes, in particular, can affect cooking food items. For example, liquids, such as water, tend to boil at lower temperatures at higher altitudes (e.g., altitudes above about 3,000 feet) than at lower altitudes. That is, as altitude increases, boiling points tend to decrease. This causes quicker evaporation and can affect moist-heat cooking techniques. Meat on a grill also can dry out more quickly at higher altitudes. Eggs, however, tend to cook longer at higher altitude. For example, for every 1,000 feet of altitude, it may take approximately 30 additional seconds to cook an egg. Leavening yeast for baking is also affected by altitude. For example, for every 1,000 feet of altitude, yeast may need to be reduced (e.g., by approximately 4%) to account for the altitude. Pasta may require additional cooking time at increased altitudes.

The present techniques represent improvements over traditional cooking and baking approaches by providing adjusted time and temperatures to cook recipes depending on the location and/or weather conditions associated with the cooking apparatus. The present techniques can learn from prior cooking experiences to make additional adjustments in the future, for example, based on user feedback or automatic feedback.

Example embodiments of the disclosure include or yield various technical features, technical effects, and/or improvements to technology. Example embodiments of the disclosure provide techniques for controlling a cooking apparatus by determining a location associated with the cooking apparatus, determining weather conditions associated with the location, and then adjusting a cooking time and/or cooking temperature based on the location and weather conditions. The adjusted cooking time and/or cooking temperature can be used to control the cooking apparatus to cook food items. These aspects of the disclosure constitute technical features that yield the technical effect of providing accurate and reliable control of a cooking apparatus to cook food items by accounting for weather and location information that can affect the cooking. As a result of these technical features and technical effects, the present techniques for controlling a cooking apparatus represent an improvement to food item preparation techniques. It should be appreciated that the above examples of technical features, technical effects, and improvements to technology of example embodiments of the disclosure are merely illustrative and not exhaustive.

Figure 4:
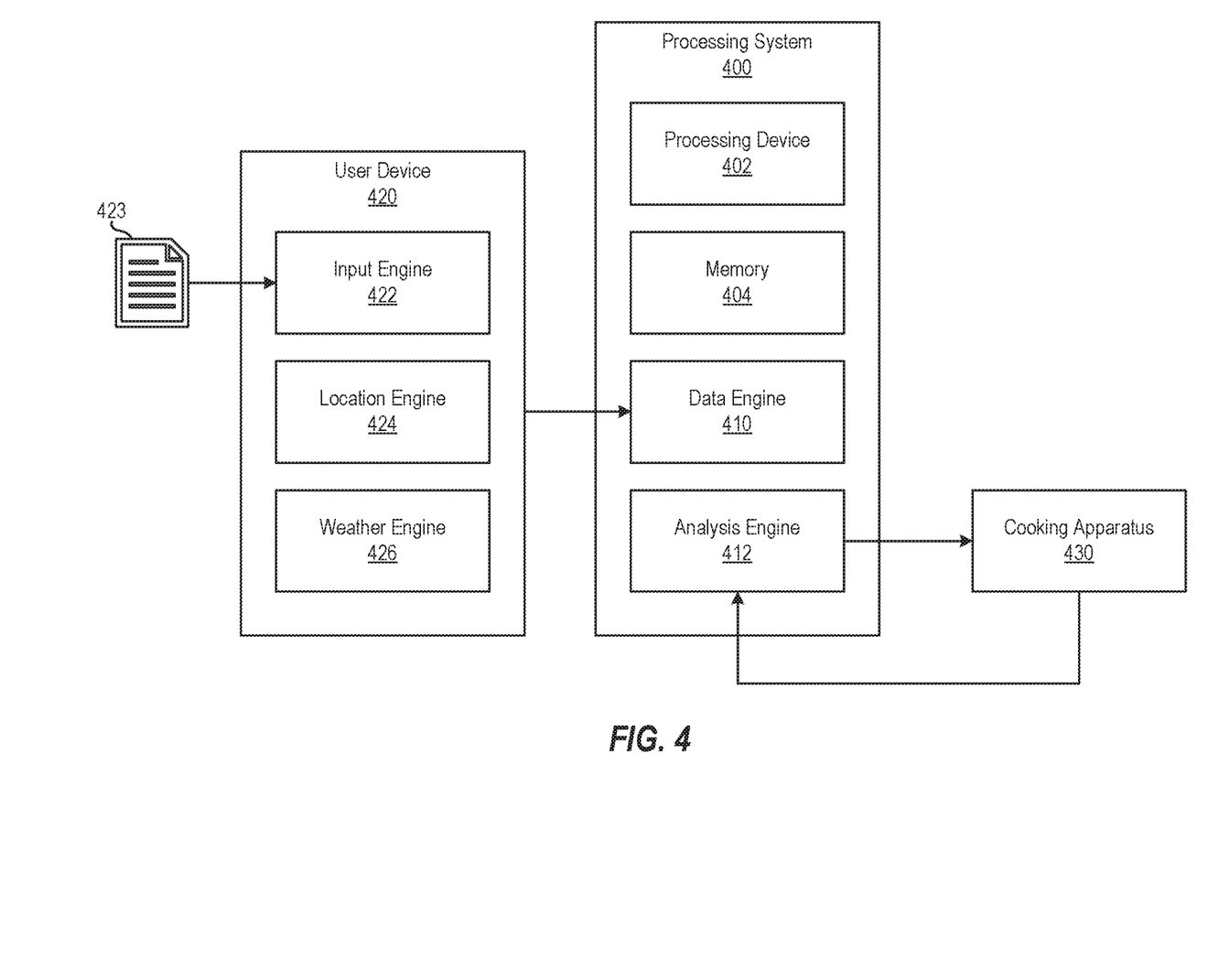
FIG. 4 depicts a block diagram of a processing system for controlling a cooking apparatus based on location and weather conditions according to one or more embodiments of the present invention.

FIG. 4 depicts a block diagram of a processing system 400 for controlling a cooking apparatus 430 based on location and weather conditions according to aspects of the present disclosure. The processing system 400 includes a processing device 402, a memory 404, a data engine 410, and an analysis engine 412.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 can be communicatively coupled to a user device 420, which can include a tablet computer, a smartphone, an e-reader, a laptop, a desktop, or another suitable computing device or computing system. The user device 420 includes an input engine 422, a location engine 424, and a weather engine 426.

The input engine 422 receives inputs from a user or from various data sources (e.g., databases). The inputs can include, for example, a recipe 423, search criteria for a recipe or recipes, and the like. For example, a user can enter each ingredient and an associated amount of the ingredient for the recipe 423 for cooking a food item on the cooking apparatus 430. In another example, the user can search a database (not shown) of recipes for the recipe 423. In either case or in similar examples, the recipe 423 is input into the user device 420 via the input engine 422. The input engine 422 can include any suitable user interface for receiving inputs from a user. The inputs can be received, for example, via an input device, such as a touchscreen, keyboard, mouse, camera, microphone, etc. For example, a user could type the recipe 423, could orally provide search criteria for the recipe 423 (e.g., "Search for chocolate chip cookie recipes"), could scan a recipe (e.g., using a scanner or camera associated with the user device 420) or the like.

The recipe 423 includes a suggested cooking time and a suggested cooking temperature. For example, the recipe can suggest a cooking time of 20 minutes at a suggested cooking temperature of 350 degrees Fahrenheit (F); a cooking time of 45 minutes at a suggested cooking temperature of 300 degrees F.; a cooking time of 10 minutes at a suggested cooking temperature of 250 degrees Celsius (C); or another suitable cooking time and cooking temperature. The recipe can further include a list of ingredients, and the ingredients can have an amount associated therewith (e.g., 3 cups of flour, 1 tablespoon of salt, 2 eggs, etc.).

The location engine 424 determines a location associated with the cooking apparatus. The location can be determined by receiving global positioning system (GPS) information (e.g., coordinates) at the user device 420. This assumes that the user device 420 is in proximity to the cooking apparatus 430 (e.g., in the same building). Although the user device 420 and the cooking apparatus 430 need not be in proximity, the closer the two devices are, the more accurate location information for the cooking apparatus 430 is since it is determined based on the location of the user device 420. However, if the cooking apparatus 430 is so equipped, GPS information of the cooking apparatus 430 can be used to determine the location of the cooking apparatus 430. In other examples, the location of the cooking apparatus 430 can be estimated, such as using a zip code or area code entered (via the input engine 422) by a user or detected automatically.

The weather engine 426 determines weather conditions associated with the location of the cooking apparatus. Weather information can include outside ambient temperature, barometric pressure, humidity, dew point, wind speed and direction, and the like. This information can be determined from various weather services using the location of the cooking apparatus determined at block 506. In other examples, a user can manually enter the weather information from observed conditions or another source via the input engine 422.

The data engine of the processing system 400 receives data from the user device 420, such as the recipe 423, the location, and/or the weather conditions. The data can then be analyzed by the analysis engine 412 to control the cooking apparatus 430 and/or adjust the recipe 423 based on the location and/or weather conditions. The analysis engine 412 can perform an analysis using known adjustments for certain ingredients, certain altitudes, and/or certain weather conditions. According to one or more embodiments of the present invention, the analysis engine 412 can utilize an adjustment matrix with adjustments to time, temperature, and/or ingredients, as depicted in the example of FIG. 7.

For example, the analysis engine 412 can suggest adjustments to cooking time, temperature, and/or ingredient amount to account for the altitude. At higher altitudes, for example, 3,000 feet or greater, the following adjustments can be made. For soft-cooked eggs, add a pinch of salt to the water before heating. For pasta, add approximately 3% more cook time for every 1,000 feet of altitude. A slow-cooker tends to experience more evaporation as altitude increases, so increase liquid content (e.g. for a gravy or sauce). Soups, stews, and sauces also take more time to cook at higher altitudes as the liquid evaporates. To account for this, add approximately 5% more cook time for each 1,000 feet increase in altitude; alternatively or additionally, add 2 tablespoons of water per 1,000 feet of elevation. Vegetables tend to take longer to cook at higher altitudes, so add 1 minute per 1,000 feet of altitude up to a maximum of 5 minutes, for example. In the case of baking cookies, the cooking temperature may need to be increased (e.g., 5 degrees per 1,000 feet altitude), the baking time may need to be decreased (e.g., reduced by 16%), an amount of a liquid ingredient may need to be increased (e.g., add ⅓ tablespoon of milk per 1,000 feet altitude), and/or other liquids or dry ingredients may need to be adjusted.

The analysis engine 412 can also adjust for weather conditions. According to one or more embodiments of the present invention, an ingredient amount can be adjusted to account for relative humidity. For example, if the relative humidity is considered dry (e.g., less than a threshold, such as 50%), a wet ingredient (e.g., butter, milk, etc.) can be increased by a certain amount or a percentage. In another example, a dry ingredient (e.g., flower, sugar, etc.) can be decreased by a certain amount or a percentage.

The analysis engine 412 can also account for characteristics of the cooking apparatus 430. For example, a particular model of oven may be known to cook hotter than its indicator would suggest (e.g., the oven is set to 350 degrees F. but the internal temperature of the oven is actually 358 degrees F.). The analysis engine 412 can adjust the cooking temperature and/or cooking time to adjust this discrepancy. In some examples, the analysis engine 412 learns these characteristics of the cooking apparatus 430 over time using feedback collected from a user and/or from the cooking apparatus 430 itself.

The analysis engine 412, after performing the analysis, can control the cooking apparatus 430 by sending commands to the cooking apparatus 430 or outputting the commands to a user to enable the user to control the cooking apparatus 430. For example, the analysis engine 412 can send a signal to the cooking apparatus 430 to set the cooking time and cooking temperature of the cooking apparatus 430, the cooking time and cooking temperature being adjusted from a cooking time and cooking temperature suggested in a recipe, the suggestion being based on location (e.g., altitude) and/or weather conditions (e.g., relative humidity).

Figure 5:
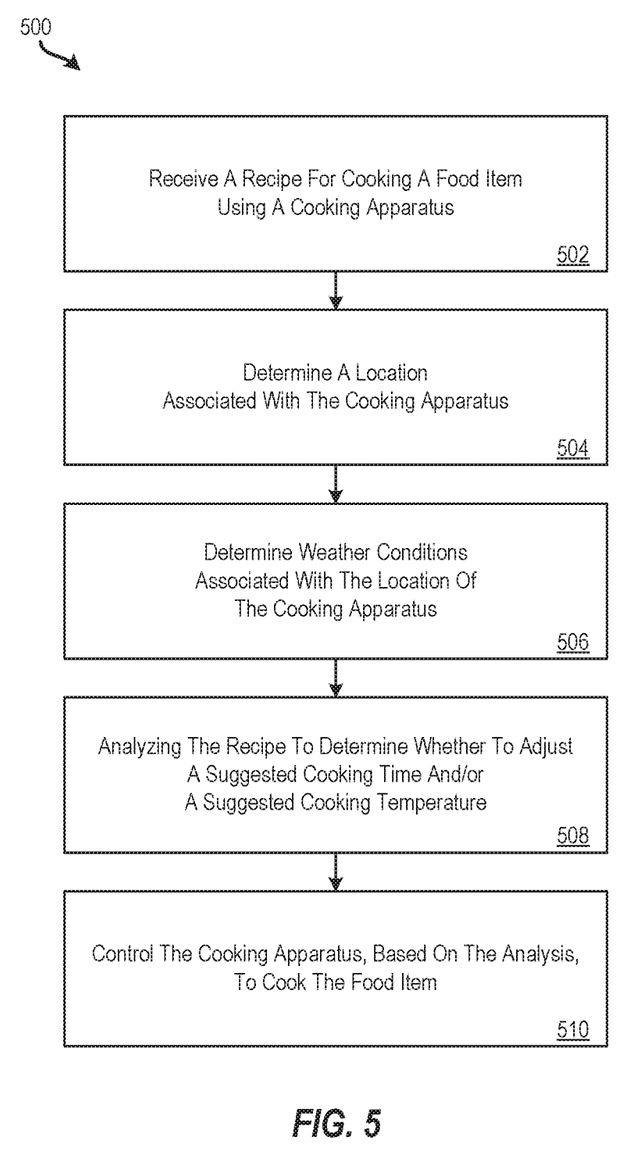
FIG. 5 depicts a flow diagram of a method for controlling a cooking apparatus based on location and weather conditions according to one or more embodiments of the present invention.

FIG. 5 depicts a flow diagram of a method for controlling a cooking apparatus based on location and weather conditions according to one or more embodiments of the present invention. The method 500 can be implanted using any suitable processing system and/or processing device. For example, the method 500 can be implemented using the processing system 300 and/or the processing system 400.

At block 502, the input engine 422 receives the recipe 423 for cooking food item using the cooking apparatus 430. The recipe includes a suggested cooking time and a suggested cooking temperature. The recipe can further include a list of ingredients, and the ingredients can have an amount associated therewith.

At block 504, the location engine 424 determines a location associated with the cooking apparatus. The location can be an exact or approximate location and can be the location of the user device 420, which is assumed to be in proximity to the cooking apparatus 430 (e.g., in the same building, in the same zip code, etc.), or can be the location of the cooking apparatus 430 itself. At block 506, the weather engine 426 determines weather conditions associated with the location of the cooking apparatus.

At block 508, the analysis engine 412 uses the location information and the weather information (received, e.g., by the data engine 410) to analyze the recipe to determine whether to adjust a suggested cooking time and/or a suggested cooking temperature. According to one or more embodiments of the present invention, the analysis engine 412 can utilize an adjustment matrix with adjustments to time, temperature, and/or ingredients, as depicted in the example of FIG. 7.

At block 510, the cooking apparatus 430 is controlled, based on the analysis, to cook the food item. For example, the cook time and cook temperate are set based on the analysis performed at block 508. The cooking apparatus 430 can provide feedback to the analysis engine 412 so that the time/temperature can be adjusted in real time based on cooking conditions within the cooking apparatus 430 and/or can be adjusted for future cooking. For example, a temperature probe (not shown) can be inserted into the food item and the internal temperature of the food item can be monitored and feedback into the analysis engine 412. If the temperature probe indicates that a food item is cooking faster than expected, for example, the analysis engine 412 may cause the cooking apparatus 430 to reduce the cooking temperature and/or reduce the cooking time.

Additional processes also may be included. For example, the method 500 can include receiving a real-time temperature from a temperature probe associated with the food item being cooked by the cooking apparatus. The method 500 can then include adjusting one or more of the suggested cooking time and the suggested cooking temperature based at least in part on the real-time temperature. According to one or more embodiments of the present invention, the recipe includes a list of ingredients, and the method 500 can include determining whether to adjust an amount of an ingredient of the list of ingredients based at least in part on the location and the weather conditions. Based at least in part on determining to adjust the amount of the ingredient, the method 500 can include indicating an adjustment amount for the ingredient, the adjustment amount being either an amount to increase or an amount to decrease. The amount to increase or the amount to decrease can be based at least in part on the location and the weather conditions.

It should be understood that the process depicted in FIG. 5 represents an illustration, and that other processes may be added or existing processes may be removed, modified, or rearranged without departing from the scope and spirit of the present disclosure.

Figure 6:
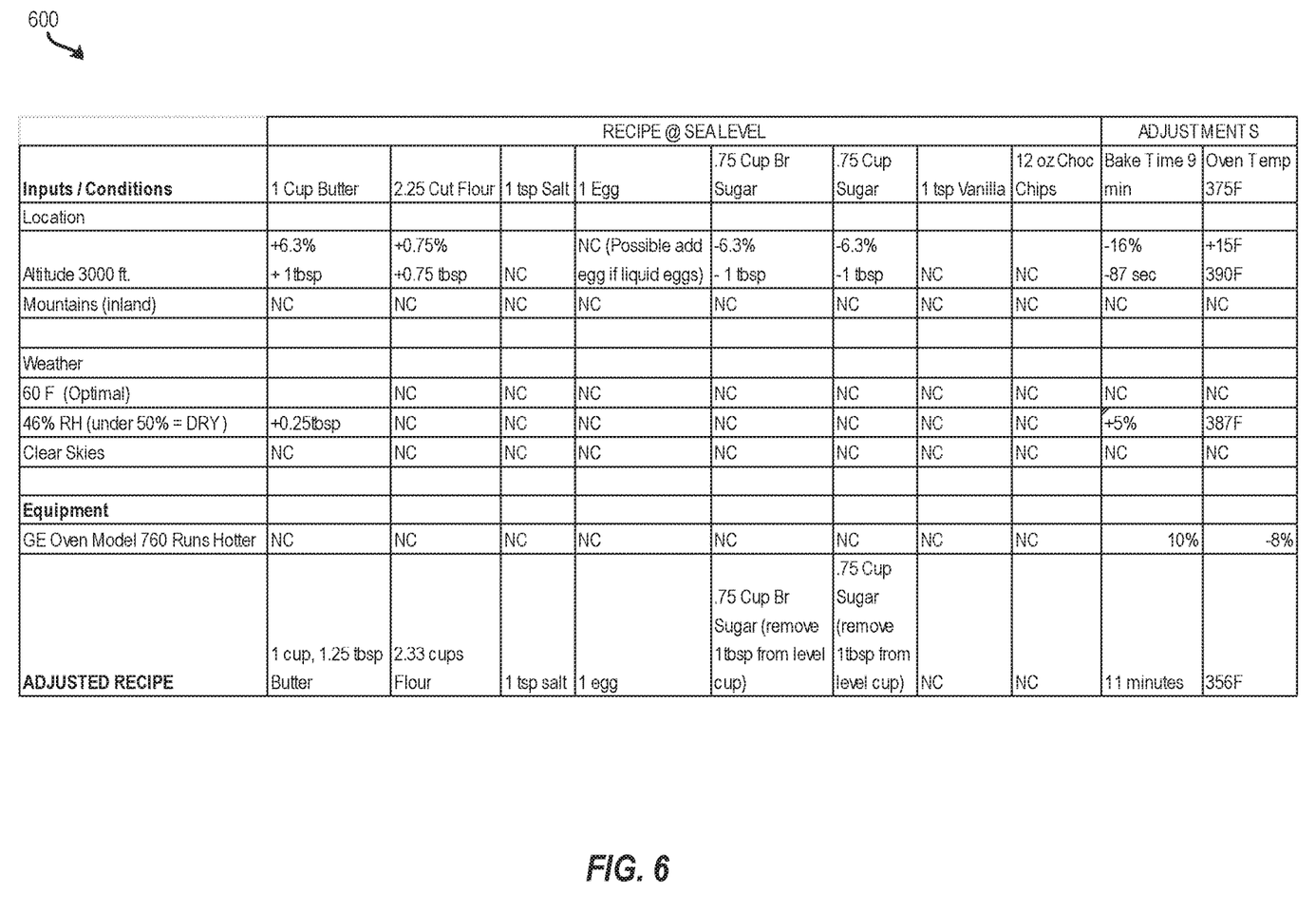
FIG. 6 depicts a table of an adjustment matrix for a sample recipe according to one or more embodiments of the present invention.

FIG. 6 depicts a table of an adjustment matrix 600 for a sample recipe according to one or more embodiments of the present invention. The analysis engine can use the adjustment matrix 600 to adjust a recipe and determine a cooking time and a cooking temperature based on weather conditions and/or location information.

The adjustment matrix 600 in the example of FIG. 6 is for a recipe for cookies based on a sea level altitude. The cooking time, cooking temperature, and ingredient amounts are adjusted based on the inputs/conditions (e.g., altitude, geographic area, weather conditions, etc.) and cooking equipment to determine an adjusted recipe with adjusted ingredients, adjusted cooking time, and adjusted cooking temperature (adjusted with respect to the sea level based recipe).

The recipe at sea level uses 1 cup of butter, 2.25 cups flour, 1 teaspoon of salt, 1 egg, 0.75 cups of brown sugar, 0.75 cups of white sugar, 1 teaspoon vanilla extract, and 12 ounces of chocolate chips. The recipe at sea level is to be baked for 9 minutes at a temperature of 375 degrees F.

The analysis engine 412 can adjust the sea level recipe to account for the altitude of 3,000 feet by increasing butter and flour, decreasing brown and white sugar, decreasing the cooking time, and increasing the cooking temperature. No adjustment is applied for the geographic location (e.g., mountains (inland)) or the ambient temperature (e.g. 60 degrees F.). The analysis engine 412 adjusts the amount of butter, increases the cooking time, and decreases the cooking temperature to adjust for the relative humidity being dry (e.g., 46% compared to a dry threshold of 50%). No adjustment is applied for the clear skies weather condition.

The analysis engine 412 can also adjust the cooking time and cooking temperature to account for the cooking apparatus used. In this example, the cooking apparatus 430 is a GE oven model 760, which has been determined to run hotter. Accordingly, the analysis engine 412 can increase the cooking time while decreasing the cooking temperature.

Based on the analysis of location and weather conditions, as well as cooking apparatus, the analysis engine 412 determines a finished recipe that includes adjusted amounts of ingredients (e.g., 1 cup+1.25 tablespoons butter, 2.33 cups flour, 1 teaspoon salt, 1 egg, 0.75 cup−1 tablespoon brown sugar, 0.75 cup−1 tablespoon white sugar, 1 teaspoon vanilla, 12 ounces chocolate chips), the cooking time (e.g., 11 minutes), and the cooking temperature (e.g., 356 degrees F.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processing device, a recipe for cooking a food item using a cooking apparatus, the recipe comprising a suggested cooking time and a suggested cooking temperature;
   determining, by the processing device, a location associated with the cooking apparatus;
   determining, by the processing device, weather conditions associated with the location;
   determining, by the processing device, a characteristic of the cooking apparatus based at least in part on a model of the cooking apparatus;
   analyzing, by the processing device, the recipe, based at least in part on the location, the weather conditions, and the characteristic of the cooking apparatus, to determine whether to adjust one or more of the suggested cooking time and the suggested cooking temperature; and
   controlling, by the processing device, the cooking apparatus, based at least in part on the analysis, to cook the food item.

2. The computer-implemented method of claim 1, further comprising:
   receiving, by the processing device, a real-time temperature from a temperature probe associated with the food item being cooked by the cooking apparatus; and
   adjusting, by the processing device, one or more of the suggested cooking time and the suggested cooking temperature based at least in part on the real-time temperature.

3. The computer-implemented method of claim 1, wherein the cooking apparatus is an oven.

4. The computer-implemented method of claim 1, wherein the recipe further comprises a list of ingredients.

5. The computer-implemented method of claim 4, further comprising:
   determining, by the processing device, whether to adjust an amount of an ingredient of the list of ingredients based at least in part on the location and the weather conditions.

6. The computer-implemented method of claim 5, based at least in part on determining to adjust the amount of the ingredient, indicating an adjustment amount for the ingredient, the adjustment amount being either an amount to increase or an amount to decrease.

7. The computer-implemented method of claim 6, wherein the amount to increase or the amount to decrease is based at least in part on the location and the weather conditions.

8. The computer-implemented method of claim 1, further comprising:
   learning, by the processing device, the characteristic of the cooking apparatus over time based at least in part on at least one of feedback collected from a user of the cooking apparatus or feedback collected from the cooking apparatus.

9. A system comprising:
   a memory comprising computer readable instructions; and
   a processing device for executing the computer readable instructions for performing a method comprising:
      receiving, by the processing device, a recipe for cooking a food item using a cooking apparatus, the recipe comprising a suggested cooking time and a suggested cooking temperature;
      determining, by the processing device, a location associated with the cooking apparatus;
      determining, by the processing device, weather conditions associated with the location;
      determining, by the processing device, a characteristic of the cooking apparatus based at least in part on a model of the cooking apparatus;
      analyzing, by the processing device, the recipe, based at least in part on the location, the weather conditions, and the characteristic of the cooking apparatus, to determine whether to adjust one or more of the suggested cooking time and the suggested cooking temperature; and
      controlling, by the processing device, the cooking apparatus, based at least in part on the analysis, to cook the food item.

10. The system of claim 9, wherein the method further comprises:
    receiving, by the processing device, a real-time temperature from a temperature probe associated with the food item being cooked by the cooking apparatus; and
    adjusting, by the processing device, one or more of the suggested cooking time and the suggested cooking temperature based at least in part on the real-time temperature.

11. The system of claim 9, wherein the cooking apparatus is an oven.

12. The system of claim 9, wherein the recipe further comprises a list of ingredients.

13. The system of claim 12, wherein the method further comprises:
    determining, by the processing device, whether to adjust an amount of an ingredient of the list of ingredients based at least in part on the location and the weather conditions.

14. The system of claim 13, based at least in part on determining to adjust the amount of the ingredient, indicating an adjustment amount for the ingredient, the adjustment amount being either an amount to increase or an amount to decrease.

15. The system of claim 14, wherein the amount to increase or the amount to decrease is based at least in part on the location and the weather conditions.

16. A computer program product comprising:
    a computer readable storage medium having program instructions embodied therewith, the program instructions executable by a processing device to cause the processing device to perform a method comprising:
       receiving, by the processing device, a recipe for cooking a food item using a cooking apparatus, the recipe comprising a suggested cooking time and a suggested cooking temperature;
       determining, by the processing device, a location associated with the cooking apparatus;
       determining, by the processing device, weather conditions associated with the location;
       determining, by the processing device, a characteristic of the cooking apparatus based at least in part on a model of the cooking apparatus;
       analyzing, by the processing device, the recipe, based at least in part on the location, the weather conditions, and the characteristic of the cooking apparatus, to determine whether to adjust one or more of the suggested cooking time and the suggested cooking temperature; and
       controlling, by the processing device, the cooking apparatus, based at least in part on the analysis, to cook the food item.

17. The computer program product of claim 16, wherein the method further comprises:
    receiving, by the processing device, a real-time temperature from a temperature probe associated with the food item being cooked by the cooking apparatus; and
    adjusting, by the processing device, one or more of the suggested cooking time and the suggested cooking temperature based at least in part on the real-time temperature.

18. The computer program product of claim 16, wherein the cooking apparatus is an oven.

19. The computer program product of claim 16, wherein the recipe further comprises a list of ingredients.

20. The computer program product of claim 19, wherein the method further comprises:
    determining, by the processing device, whether to adjust an amount of an ingredient of the list of ingredients based at least in part on the location and the weather conditions; and
    based at least in part on determining to adjust the amount of the ingredient, indicating an adjustment amount for the ingredient, the adjustment amount being either an amount to increase or an amount to decrease, wherein the amount to increase or the amount to decrease is based at least in part on the location and the weather conditions.

* * * * *